United States Patent [19]

Ikebe et al.

[11] Patent Number: 4,991,048

[45] Date of Patent: Feb. 5, 1991

[54] DISC CARTRIDGE CASING WITH SHUTTER SLIDABLY FITTED THEREIN TO UNCOVER A PICK-INSERTING HOLE

[75] Inventors: Masaru Ikebe; Haruo Shiba, both of Nagano, Japan

[73] Assignee: TDK Corporation, Japan

[21] Appl. No.: 257,431

[22] Filed: Oct. 13, 1988

[30] Foreign Application Priority Data

Oct. 15, 1987 [JP] Japan .......................... 62-156644[U]
Oct. 15, 1987 [JP] Japan .......................... 62-156646[U]

[51] Int. Cl.$^5$ .............................................. G11B 23/03
[52] U.S. Cl. ................................................... 360/133
[58] Field of Search ......................... 360/133; 369/291

[56] References Cited

U.S. PATENT DOCUMENTS 4,740,948 4/1988 Nakamori et al. .................. 360/133

Primary Examiner—Robert S. Tupper
Attorney, Agent, or Firm—Steinberg & Raskin

[57] ABSTRACT

A disc cartridge facilitates manufacturing of a shutter plate with manufacturing high yields and also facilitates pressing of the shutter plate, as well as ensuring smooth loading and unloading of the disc cartridge in a cartridge operating unit. In the disc cartridge, a slider is provided with projections and holes for engagement and each of the shutter plates is provided with an L-shaped connected portion formed with holes and projections respectively engageable with the projections and holes of the slider, and connection of the slider to the shutter plates for assembling a shutter is accomplished through engagement between the projections and holes of the slider and shutter plates while abutting inner and end surfaces of the slider against horizontal and vertical portions of the stepped connected section of each of the shutter plates.

12 Claims, 7 Drawing Sheets

DISC CARTRIDGE CASING WITH SHUTTER SLIDABLY FITTED THEREIN TO UNCOVER A PICK-INSERTING HOLE

BACKGROUND OF THE INVENTION

1. Field of the Invention

This invention relates to a disc cartridge, and more particularly to a disc cartridge in which a disc medium such as an optical disc, a photo-magnetic disc, a magnetic disc, a floppy disc or the like is received.

2. Description of the Prior Art

In general, a tray system or a cartridge system using a casing has been conventionally employed for protecting a floppy disc, a compact disc, a video disc or the like which is used for a digital-data storing unit, a video unit or the like from damage and dust to ensure its safety during the storage and operation. For this purpose, the casing is provided with a slidable shutter made of metal which is adapted to close a pickup inserting hole and/or a drive shaft inserting hole of the casing and to open these respective holes when the system is in use.

Such a shutter generally comprises a metal plate formed into a U-shape. For this purpose, the metal plate is subjected to stamping and bending to make the shutter integral with a slider. Unfortunately, this process leads to waste of the metal material and makes manufacturing of the shutter very difficult. This construction of the conventional shutter causes a shutter operating pin to strike against it thus wearing and/or damaging the pin, so that dust is produced.

Another shutter is used which is formed into a U-shape by mounting a slider on a shutter body by means of screws. However, this causes the number of manufacturing parts to greatly increase, as well as making manufacturing of the shutter difficult due to integration of a metal plate into the shutter body by means of pressing and bending operations, resulting in a decreased productivity rate of the shutter.

In view of the above, a shutter of having a three-part structure has been proposed which comprises two shutter plate members and a slider connected to the shutter plates through engagement between respective projections and recesses provided at the slider and shutter plates, as disclosed in Japanese Utility Model Application Laying-Open Publication No. 63879/1984. Unfortunately, the proposed shutter has an important disadvantage of failing in smooth handling of a cassette with respect to a disc cartridge operating unit such as a recording and/or reproducing unit (hereinafter referred to as "cartridge operating unit"), because a shutter operating pin of the unit often strikes against the aforementioned engagement projections or recesses.

In general, such a shutter including a slider is slidably biased by a combination of a shaft and a coiled spring. For example, in a slider disclosed in Japanese Utility Model Application Laying-Open Publication No. 55266/1986, blocks for engagement are provided at two or more portions of the slider on both sides of a pickup inserting hole and a shaft arranged within a stroke width of the slider is tightly inserted into the blocks, thus supporting the slider. Such construction causes the blocks for engagement to necessarily pass over the pickup inserting hole when the slider is moved, and accordingly, a space is required to permit passing of the blocks. This causes the shutter to occupy a relatively large area in a disc cartridge, resulting in the failure to ensure a desired relative position of a pickup in a cartridge operating unit. Also, this leads to striking of the shutter against a shutter operating pin of the unit which prevents smooth loading and unloading of the cartridge with respect to the unit.

Accordingly, there has been a need to develop a disc cartridge which prevents wear and damage of the shutter operating pin and ensures a desired positioning of a pickup of a cartridge operating unit, as well as being capable of being readily assembled thus resulting in a significant increase in the productivity rate of the cartridge.

SUMMARY OF THE INVENTION

In accordance with the present invention, a disc cartridge is provided. The disc cartridge includes a casing comprising an upper casing member and a lower casing member joined together to define a space therein. The casing is formed with at least one pickup inserting hole through which a pickup of a cartridge operating unit is inserted into the casing. The disc cartridge also includes a disc which is rotatable within the casing and a shutter formed into a substantially U-shape and constituted by upper and lower shutter plates and a slider for connecting the upper and lower shutter plates to each other. The shutter is slidably mounted or fitted on the casing for covering and uncovering the pickup inserting hole. The shutter plates each have a section connected to the slider. The connected section of the shutter plate is stepped such that it includes a downwardly extending vertical portion and a horizontal portion outwardly extending from a lower end of the vertical portion. In a preferred embodiment, the stepped connected section is formed into a substantially L-shape. The slider has a section connected to each of the shutter plates, which has an inner surface and an end surface and is formed with at least one aperture and at least one projection for engagement with a shutter plate. The stepped connected section of each of the shutter plates is formed with at least one projection and at least one aperture respectively engaged with the hole and projection of the slider. The connections between the slider and each of the shutter plates are accomplished through engagements between the holes and projections of the slider and shutter plate while the inner surface and end surface of the slider abut against the horizontal portion and vertical portion of the stepped connected section of the shutter plate.

The disc cartridge may further include a shutter compacting structure, which may be constructed in such a manner that the slider includes a side wall arranged on one side of the slider on which the pickup inserting hole is opened and formed with a holding hole in which a shaft for guiding the slider thereon is engagedly fitted, the casing is formed on an inner surface thereof with guiding means, and the slider also includes guided means arranged on the other side of the slider and slidably engaged with the guiding means of the casing.

Accordingly, it is an object of the present invention to provide a disc cartridge which is capable of preventing wear of and damage to a cartridge operating element of a cartridge operating unit such as a shutter operating pin.

It is another object of the present invention to provide a disc cartridge which is capable of being readily assembled to lead to an improvement in the productivity rate of the cartridge and a decrease in the manufacturing cost thereof.

It is a further object of the present invention to provide a disc cartridge which includes a shutter capable of being efficiently manufactured by simple pressing to give a high manufacturing yield of acceptable cartridges.

It is still another object of the present invention to provide a disc cartridge which is capable of safely and smoothly loading and unloading a cartridge operating unit.

It is still a further object of the present invention to provide a disc cartridge which is capable of ensuring a desired or free positioning of a pickup of a cartridge operating unit.

It is yet a further object of the present invention to provide a disc cartridge which is capable of causing an area occupied by a shutter to be significantly decreased.

Still other object and advantages of the invention will be apparent from the specification.

BRIEF DESCRIPTION OF THE DRAWINGS

For a fuller understanding of the invention, reference is had to the following description taken in connection with the accompanying drawings in which like reference numerals designate like or corresponding parts throughout; wherein.

DETAILED DESCRIPTION OF THE PREFERRED EMBODIMENT

Figure 1:
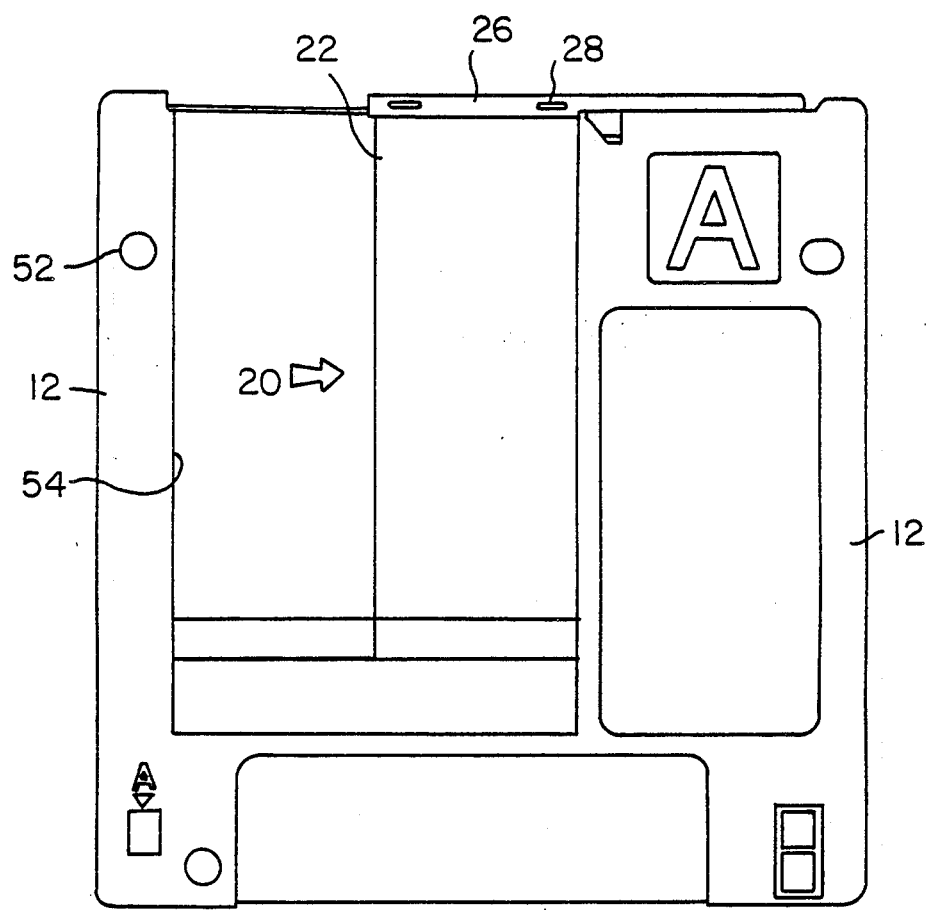
FIG. 1 is a plan view showing an embodiment of a disc cartridge according to the present invention.

Now, a disc cartridge according to the present invention will be described hereinafter with reference to the accompanying drawings.

The following description will be made in connection with an optical disc cartridge, however, the present invention is not limited to such an optical disc cartridge.

FIGS. 1 to 11 illustrate an optical disc cartridge which is an embodiment of a disc cartridge according to the present invention. An optical disc cartridge of the illustrated embodiment includes an optical disc 10 and a casing 12 for rotatably receiving the disc 10 therein. The casing 12 comprises an upper casing member 14 and a lower casing member 16 which are joined together to define a disc receiving space therein. The upper and lower casing members 14 and 16 of the casing 12 each are formed with a hole 18 for inserting a recording and/or reproducing pickup of a cartridge operating unit therethrough into the cartridge.

Figure 4:
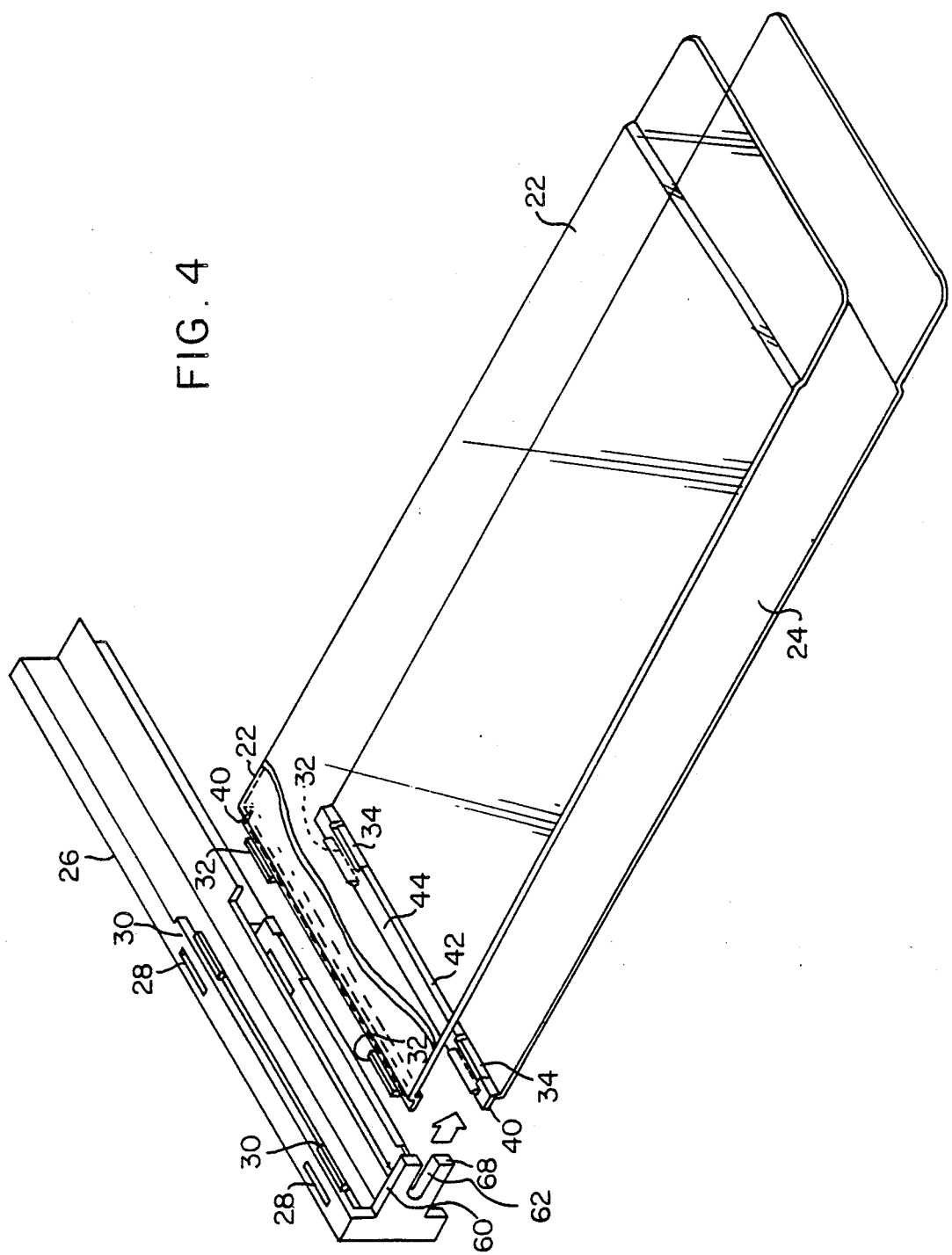
FIG. 4 is an enlarged perspective view showing a shutter.
Figure 6:
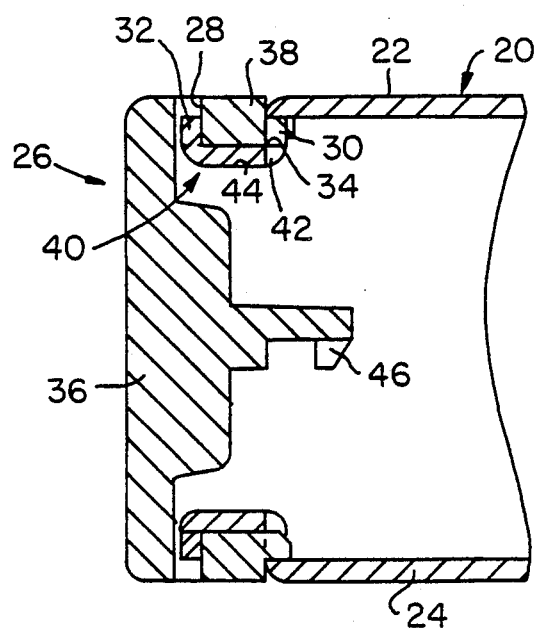
FIG. 6 is a sectional view taken along line VI—VI of FIG. 5.
Figure 7:
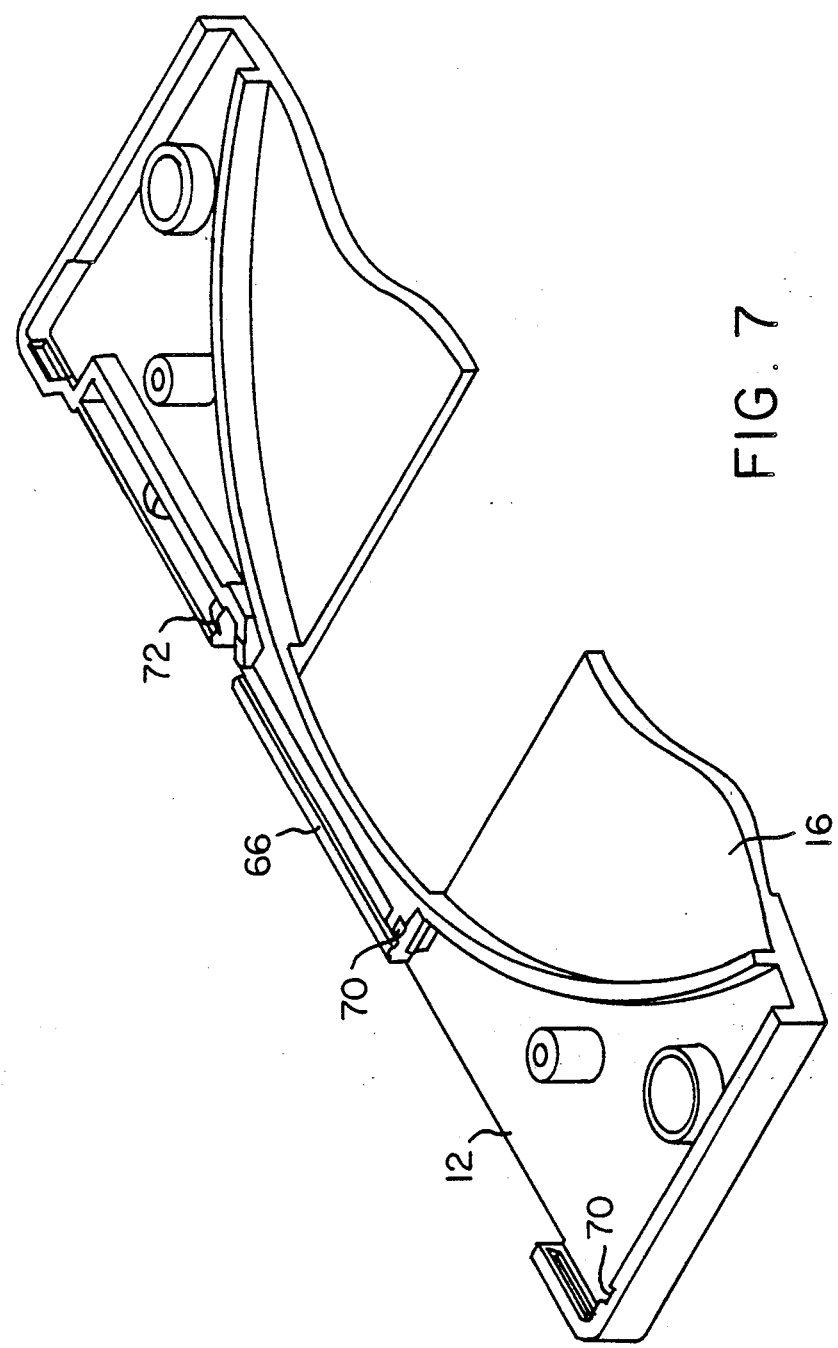
FIG. 7 is a fragmentary perspective view showing a lower casing member.

The disc cartridge also includes a shutter 20 for operating the pickup inserting holes 18 while interposing upper and lower surfaces of the casing 12. For this purpose, the shutter 20 is formed into a substantially U-shape. More particularly, the shutter 20 includes upper and lower shutter plates 22 and 24 and a slider 26 for connecting the upper and lower shutter plate members 22 and 24 to each other, as shown in FIGS. 4 and 6. Thus, the slider 26 acts as a side wall of the shutter 20 as well as providing the shutter 20 with a sliding function. The upper and lower shutter plates 22 and 24 may be made of stainless steel such as SUS 304 and the slider 26 is preferably formed of a lubricious material such as polyacetal.

The shutter 20 is so constructed that pressing of the shutter plate members 22 and 24 is facilitated when they are formed by stamping of a metal plate. Also, the shutter 20 is designed to result in high yields. Further, it may be so designed that the outer surface of the slider 26 is substantially smoothed to thereby ensure smooth loading and unloading of the cartridge with respect to a cartridge operating unit.

Figure 5:
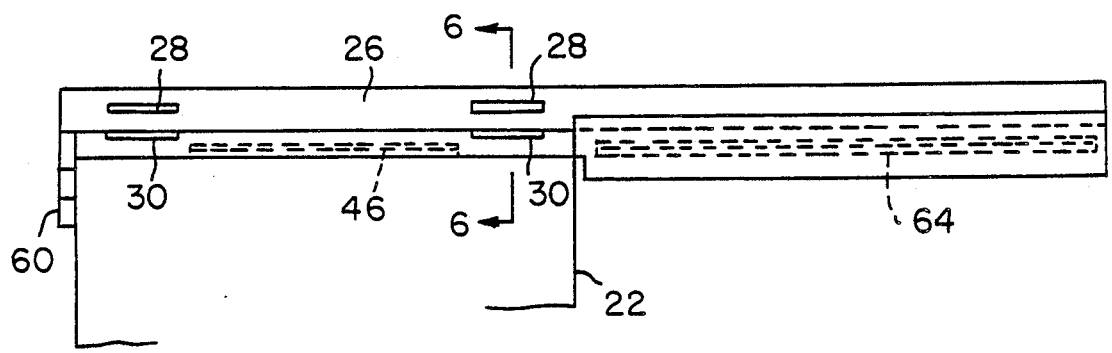
FIG. 5 is a plan view showing a slider of a shutter.

For this purpose, the slider 26, as shown in FIGS. 4 to 6, is provided at a section thereof connected to each of the upper and lower shutter plates 22 and 24 with at least one hole 28 for engagement and at least one projection 30 for engagement, and correspondingly the shutter plates 22 and 24 each are formed at a section thereof connected to the slider 26 with at least one projection 32 and at least one hole 34 respectively engaged with the hole 28 and projection 30 of the slider 26. In the illustrated embodiment, an outer configuration of the slider 26 connected to the shutter plates 22 and 24, as shown in FIG. 6, is formed into a substantially C-shaped section, so that it may be constituted by a vertical slider body 36 and both legs 38 arranged at both ends of the slider body 36 and each having an inner surface and an end surface. The hole 28 is formed at a portion of the leg 38 in proximity to the slider body 36 and the projection 30 is formed at the end surface of the leg 38. Each of the shutter plates 22 and 24 is inwardly stepped at its section connected to the slider 26 as shown in FIG. 4, resulting in a stepped connected section 40 being formed which has a downwardly extending vertical portion 42 and a horizontal portion 44 outwardly extending from a lower end of the vertical portion 42. In the illustrated embodiment, the stepped connected section 40 is formed into a substantially L-shape. The projection 32 is provided at a distal end of the horizontal portion 44 of the L-shaped connected section 40 so as to upwardly extend therefrom and the hole 34 is formed at the vertical portion 42 of the L-shaped connected section 40. In the illustrated embodiment, each of the upper and lower shutter plates 22 and 24 is each provided with two such projections 32 and holes 34, which are respectively arranged so as to be spaced at a suitable distance from each other as shown in FIG. 4 and correspondingly of the legs 38 is provided with each two such holes 28 and and two projections 30. The projections 32 and holes 34 may be arranged in a manner to positionally correspond to each other. The connection between the slider 26 and each of the shutter plates 22 and 24, as shown in FIG. 6, is carried out by fitting the projections 32 in the holes 28 and fitting the projections 30 in the holes 34 while abutting the inner surface of each of the legs 38 against the horizontal portion 44 of the L-shaped connected section 40 and abutting the end surface of the leg 38 against the vertical portion 42 of the connected section 40.

Also, the slider 26 and shutter plates 22 and 24, particularly, the legs 38 of the slider 26 and the L-shaped connected section 40 of each of the shutter plates 22 and 24 are preferably formed into dimensions and configurations sufficient to cause the outer surface of the slider 26 to be substantially free of any protrusion when the slider 26 are connected to the shutter plates 22 and 24 to form the shutter 20. Further, the slider 26 and shutter plates 22 and 24 are preferably formed into dimensions and configurations sufficient to cause them to be connected together in a manner to abut with each other.

The relationships between the holes 28 and the projections 32 and between the holes 34 and the projections 30 may be different those described above. Also, the holes 34 and projections 30 may be formed at the horizontal portion 44 of each of the L-shaped connections 40 and the inner surface of the leg 38, respectively.

Figure 2:
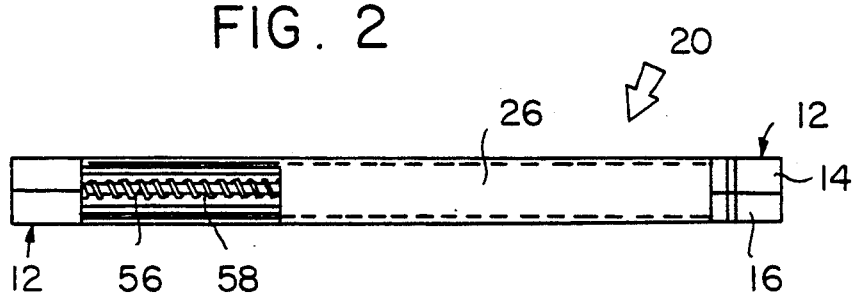
FIG. 2 is a front view of the disc cartridge shown in FIG. 1.
Figure 3:
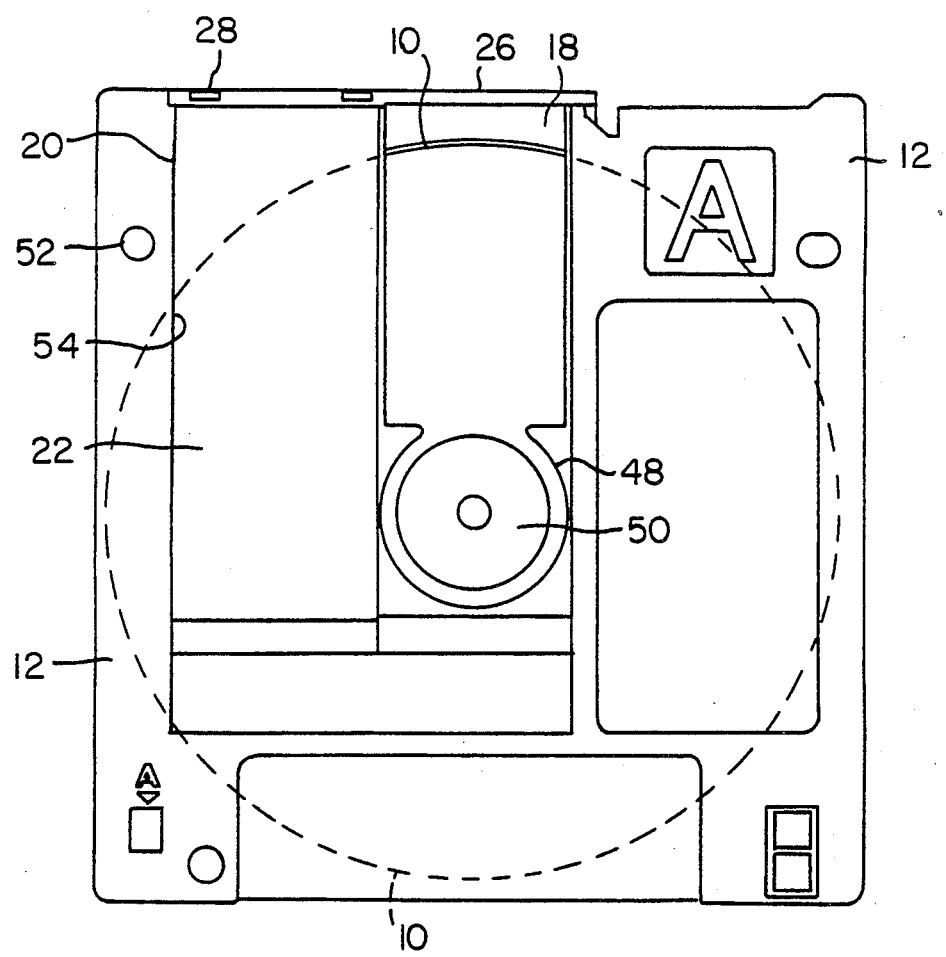
FIG. 3 is a plan view of the disc cartridge shown in FIG. 1 wherein a shutter is kept open.
Figure 8:
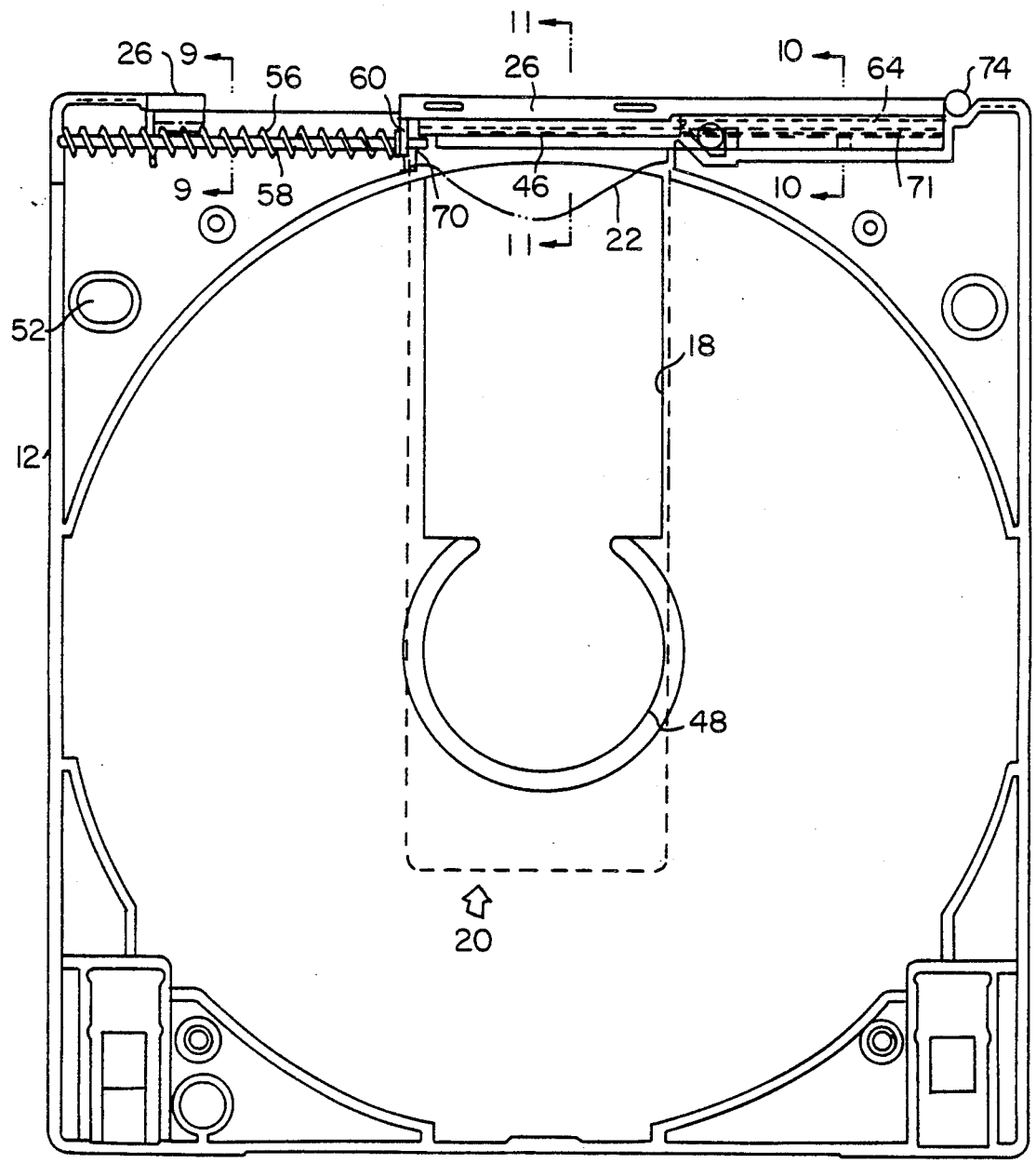
FIG. 8 is a plan view showing a lower casing member on which a shutter is mounted.
Figure 9:
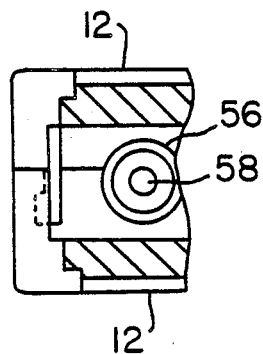
FIG. 9 is an enlarged vertical sectional view taken along line IX—IX of FIG. 8.
Figure 10:
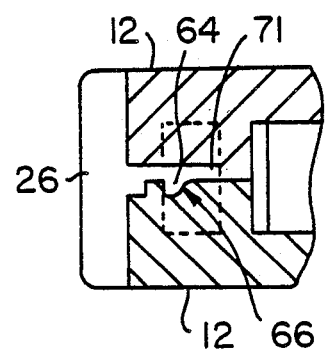
FIG. 10 is an enlarged vertical sectional view taken along line X—X of FIG. 8.

The slider 26 may be provided with a projection 46 for engagement which is slidably fitted in a guide groove of the casing 12 as described below, to thereby cause the slider 26 to be slidably movable with respect to the casing 12. Also, the casing 12 is formed at a central portion thereof with circular openings 48, in which hubs 50 of the disc 10 are arranged, as shown in FIG. 3. Furthermore, the casing 12 is formed with the pickup inserting holes 18 of a rectangular shape, pin inserting holes 52 and recesses 54 for slidably receiving the shutter 20. The shutter 26 is constantly urged in a direction for closing the pickup inserting holes 18 by a return spring 56 wound on a shaft 58, as shown in FIGS. 2 and 8. Thus, the pickup inserting holes 18 are kept covered by the shutter 20 or nonuse of the disc cartridge; whereas when the disc cartridge is loaded in a cartridge operating unit, the shutter 20 is slidably moved on the shaft 58 through engagement between a shutter operating pin of the unit and the slider 26 in a direction of opening the holes 18 against the return spring 56, resulting in the holes 18 being uncovered. When the cartridge is unloaded from the unit, the return spring 56 moves the shutter 20 to the original position to close the holes 18.

The upper and lower shutter plates 22 and 24 may be formed by pressing, during which the projections 32 and holes 34 for engagement may be concurrently formed. Then, the projections 32 and L-shaped connection 40 are subjected to bending.

As can be seen from the foregoing, in the disc cartridge of the illustrated embodiment, the slider is provided with the projections and holes for engagement and correspondingly each of the shutter plates is provided with the stepped connected portion which are formed with the holes and projections respectively engaged with projections and holes of the slider, and engagement between the projections and holes of the slider and shutter plates is carried out while abutting the inner surface and end surface of the slider against the horizontal portion and vertical portions of the stepped connected section of each of the shutter plates. Such structure in the embodiment permits manufacturing of the shutter plate to be carried out in high yields and facilitates pressing of the shutter plate. Also, it permits the outer surface of the slider to be free of any protrusion for engagement or holding to ensure smooth loading and unloading of the disc cartridge with respect to a cartridge operating unit. Also, the structure causes a shutter operating pin of a cartridge operating unit to be abutted against the slider which has a lubricious property, so that wear and damage of the pin which lead to generation of dust may be effectively prevented.

Further, the illustrated embodiment may include a shutter compacting structure. More particularly, it may be constructed so as to cause an area occupied by the shutter to be significantly decreased to enlarge a space required for pickup insertion and ensure a desired or free layout of a pickup of a cartridge operating unit.

For this purpose, in the illustrated embodiment, the shutter 20 is provided at a bifurcated side wall 60 thereof comprising on one side thereof the pickup inserting hole 18 is opened and also comprising projection 68 having a holding hole 62, as shown in FIG. 4, in which the shaft 58 is fitted so that the slider 26 may be slidably guided on the shaft 58, as shown in FIG. 8. Also, the slider 26 is provided on the side thereof opposite to the side wall 60 with horizontally extending guided means 64 (FIGS. 5 and 8), which is engaged with guiding means 66 (FIG. 7) formed on an inner surface of the casing 12. In the illustrated embodiment, the guided means 64 and guiding means 66 comprise a projection such as a rail and a groove in which the groove is fitted, respectively. However, the guide means 64 and guiding means 66 may comprise a groove and a projection on which the groove is fitted, respectively.

The holding hole 62 of the side wall 60 of the slider 26 is opened sideways. More specifically, in the illustrated embodiment, it takes the form of an elongated cutout of which one side end or a free side end 68 is opened sideways, so that the end 68 of the side wall 60 is bifurcated through the cutout. The guided projection 64 is positioned on a central axis of the holding hole 62 and the slider 26 is not guided at this portion by means of the shaft 58. The projection 64 is preferably formed into a hook-like shape or a shape having an oblique surface so that insertion of the projection 64 into the groove 66 may be facilitated. Also, the projection 64 is arranged at a central portion of an inner side surface of the slider 26 through a rib-like projection 71 formed on the inner side surface of the slider 26 so as to extend in the direction of movement of the slider. Such arrangement of the projection 64 effectively prevents it from extending to a position in proximity to an upper or lower surface of the slider 26.

The above-described engaged portion or projection 46 of the slider 26 is located at a portion of the slider 26 covered with the shutter plates 22 and 24 and is also tightly guided by the groove 66 of the casing 12.

Reference numerals 70 (FIGS. 7 and 8) and 72 (FIG. 7) designate a shaft holding groove and slider guide provided on the inner surface of the casing 12, respectively, and reference numeral 74 is a shutter operating pin of a cartridge operating unit.

Figure 11:
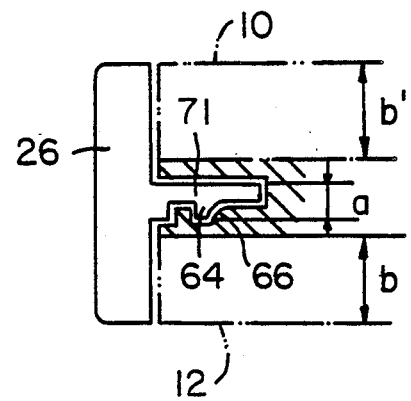
FIG. 11 is an enlarged vertical sectional view taken along line XI—XI of FIG. 8 wherein a shutter is kept open.

In the shutter compacting structure described above, when the shutter 20 is mounted on the casing 12, the portion of the slider 26 engaged with the guide shaft 58 is only on the one side of the slider on which the pickup inserting holes 18 are opened and the other side of the slider is held through the projection 64 at the casing 12, resulting in only the side wall 60 of the slider 26 being moved in a pickup inserting area. Also, there is not arranged any shaft in the area. Thus, as shown in FIG. 11, a dimension "a" is reduced, so that spaces "b" and "b'" in which the pickup is inserted may be significantly enlarged.

As can be seen form the foregoing, the shutter compacting structure is so constructed that it includes the side wall arranged on the one side of the slider on which the pickup inserting holes are opened and formed with the holding hole in which the shaft for guiding the slider thereon is engagedly fitted, the casing is formed on the inner surface thereof with guiding means, and it also includes the guided means arranged on the other side of the slider and slidably engaged with the guiding means of the casing. Such construction permits an ample space in the casing for inserting a pickup of a cartridge operating unit because the relative area occupied by the shutter is significantly reduced, to thereby ensure a desired positioning of the pickup. Also, the structure facilitates mounting of the shutter on the casing and effectively prevents wear and damage of the shutter operating pin because the pin is abutted against the slider which is lubricious, so that smooth and safe loading and unloading of the cartridge with respect to the unit and smooth sliding movement of the slider may be ensured, resulting in the reliability of the cartridge being highly improved.

It will thus be been that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A disc cartridge comprising:
    a casing comprising an upper casing member and a lower casing member joined together to define a space therein, said casing having at least one pickup inserting hole;
    a disc mounted in said casing so as to be rotatable therein; and
    a shutter having a substantially U-shape and comprising upper and lower shutter plates and a slider for connecting said upper and lower shutter plates to each other, said shutter being slidably fitted on said casing for covering and uncovering said pickup inserting hole;
    each of said shutter plates having a section thereof connected to said slider, said connected section being stepped such that it includes a downwardly extending vertical portion and a horizontal portion outwardly extending from a lower end of said vertical portion;
    said slider having respective sections connected to each of said shutter plates, said respective connected sections of said slider each having an inner surface and an end surface and having at least one hole and at least one projection for engagement with said stepped connected portion of each of said shutter plates;
    said stepped connected section of each of said shutter plates having at least one projection and at least one hole respectively engaged with said hole and projection of said slider; and wherein
    connection between said slider and each of said shutter plates can be carried out through engagements between respective said holes and projections of said slider and shutter plate by abutting said inner surface and said end surface of said slider respectively against said horizontal portion and vertical portion of said stepped connected section of said shutter plate.

2. A disc cartridge as defined in claim 1, wherein said stepped connected section of said shutter plate is formed into a substantially L-shape.

3. A disc cartridge as defined in claim 1, wherein said slider and shutter plates are formed into dimensions and configurations sufficient to cause an outer surface of said slider to be free of any protrusion when they are connected together with each other.

4. A disc cartridge as defined in claim 1, wherein said slider and shutter plates are formed into dimensions and configurations sufficient to cause them to be connected together in a manner to be flush with each other.

5. A disc cartridge as defined in claim 1, wherein said slider is substantially C-shaped such that it comprises a vertical slider body and two legs formed at opposite ends of said vertical slider body; and wherein
    said legs comprise said respective connected sections of said slider.

6. A disc cartridge as defined in claim 1, wherein said projection of each of said shutter plates is connected to a distal end of said horizontal portion of said connected section of said shutter plates and said hole of said shutter plate is formed at said vertical portion of said stepped connected section of said shutter plate in a manner to positionally correspond to said projection of said slider.

7. A disc cartridge as defined in claim 6, wherein two of said projections and two of said holes are provided at each of said shutter plates in a manner to be spaced from each other.

8. A disc cartridge as defined in claim 1 further comprising a shutter compacting structure constructed in such a manner that said slider further comprises a side wall arranged on one side thereof on which said pickup inserting hole is opened and said sidewall comprises a projection having a holding hole and said shutter compacting structure further includes a shaft for guiding said slider;
    said casing comprising guiding means on an inner surface thereof; and
    said slider also comprising guided means arranged on another side thereof, said guided means being slidably engaged with said guiding means of said casing.

9. A disc cartridge as defined in claim 8, wherein said guided means comprises a projection and said guiding means comprises a groove.

10. A disc cartridge as defined in claim 8, wherein said side wall of said slider is bifurcated at one side end thereof.

11. A disc cartridge as defined in claim 10 wherein said holding hole comprises an elongated cutout.

12. A disc cartridge as defined in claim 8, wherein said guided means comprises a hook-like projection arrangement on the inner surface of said slider.

* * * * *